Patented Oct. 3, 1950

2,524,086

UNITED STATES PATENT OFFICE 2,524,086

POLYCYCLICALKYL ARYLSULFONIC ACID DERIVATIVES AS SURFACE-ACTIVE AGENTS

Louis Schmerling, Riverside, Ill., assignor to Universal Oil Products Company, Chicago, Ill., a corporation of Delaware No Drawing. Application November 20, 1948, Serial No. 61,315

16 Claims. (Cl. 260—505)

This invention relates to the production of wetting agents, certain species of which possess detersive properties by the process which comprises condensing an aromatic compound, particularly a benzenoid hydrocarbon, with an alkylating agent consisting of an alkylbicycloheptene to form an alkylbicycloheptylaryl compound and thereafter sulfonating the alkylate and forming the substantially neutral salts thereof, if desired.

Another aspect of this invention concerns the production of novel compositions of matter consisting of the alkylbicycloheptylarylsulfonic acids and their salts utilizable particularly as surface-active agents.

It is already known that aromatic hydrocarbons or other aryl compounds containing a nuclearly displaceable hydrogen atom may be condensed with olefins in the presence of certain so-called condensing agents or catalysts, hereinafter characterized, to form alkylates or aralkyl compounds which may be sulfonated and the sulfonic acid product neutralized to form surface-acting and detersive compounds. I have now found that the condensation and subsequent sulfonation processes may be applied with effectiveness to the formation of alkylbicycloheptylarylsulfonic acid compounds which are active wetting agents and detergents and may be employed in many other applications requiring surface-active compounds.

The process of the present invention, the object of which is the production of a compound which in its aqueous solution possesses surface-active properties, comprises alkylating an aromatic compound containing a nuclearly displaceable hydrogen atom at alkylating conditions with an alkylbicycloheptene in the presence of an alkylation catalyst, thereafter separating an alkylbicycloheptylaryl compound from the alkylation reaction product, contacting the same with a sulfonating agent at sulfonation reaction conditions and separating the sulfonic acid derivative of said alkylbicycloheptylaryl compound from the sulfonation reaction mixture.

A more specific embodiment of the invention concerns a process for the production of a neutral surface-active agent which comprises condensing a cyclopentadiene with an olefin containing at least five carbon atoms per molecule to form an alkylbicycloheptene, alkylating benzene with said alkylbicycloheptene in the presence of a sulfuric acid alkylation catalyst to form an alkylbicycloheptylbenzene, reacting said alkylate with a sulfonating agent at reaction conditions sufficient to effect the sulfonation thereof, separating the resulting sulfonic acid derivative of said alkylate from the sulfonation reaction mixture and neutralizing said sulfonic acid with an aqueous alkali metal hydroxide solution.

Other embodiments of the process relating to specific reactants, methods of effecting the alkylation and sulfonation stages of the process and the particular process flows utilizable in the reaction will be referred to more specifically in the following further description of the invention.

Aromatic compounds utilizable as the bicycloalkyl acceptor of the present process to form the alkylate charging stock to the sulfonation stage thereof are characterized generally as containing a nuclearly substitutable or displaceable hydrogen atom which may be alkylated without steric hindrance and include the benzenoid and polycyclic aromatic hydrocarbons containing up to about four substituent groups attached to the aromatic nucleus, such as benezene itself, the alkyl benzenes such as toluene and ethylbenzene, preferably the mono- and dialkylbenzenes containing fewer than five carbon atoms per alkyl group, diphenyl, anthracene, phenanthrene, naphthalene, and their alkyl derivatives; phenol and its homologs such as toluol and the substituted phenols, such as the chloro- and the aminophenols; the cresols such as ortho-cresol; the polyhydroxy aromatic compounds, such as hydroquinone; the hydroxynaphthalenes, such as 1- and 2-naphthol and other alkylatable aromatic compounds.

The alkylbicycloheptene alkylating agent herein specified may be produced by any suitable means known to the art, such as the general synthetic method shown by the C. L. Thomas Patent No. 2,340,908. In order to form bicyclic olefin alkylating agents which produce surface-active products in accordance with the present process, the mono-olefin condensed with the cycloalkadiene must of necessity contain at least three carbon atoms per molecule, such as propylene, butene-1, butene-2, pentene, normal hexene, normal heptene, and normal octane. The preferred olefinic hydrocarbons condensed with the cyclopentadiene to yield the alkyldicycloheptene alkylating agent herein contain at least five carbon atoms, thereby yielding a condensation product containing an alkyl group having at least three carbon atoms per group. Further preference is accorded the long chain olefins (containing from 8 to 12 carbon atoms per molecule) which yield the most desirable detergents upon subsequently alkylating an aromatic hydrocarbon with the alkylbicycloheptene alkylating agent and sulfonating the alkylation product. The alkylating agents are generally formed via thermal condensation of the cyclopentadiene and the mono-olefin reactant in accordance with the processes described by the art.

The condensation of the aromatic alkyl acceptor and the bicycloheptene alkylating agent herein provided is effected in the presence of an alkylation catalyst selected from the relatively large group of compounds known to have such activity and possessing the common characteristic of being acid-acting. Thus, suitable catalytic agents which promote the condensation of the aromatic compound and the alkylbicycloheptene alkylating agents are such substances as sulfuric acid, preferably containing at least 85, up to about 98% of the acid, hydrofluoric acid, containing less than 10% by weight of water, phosphoric acid, preferably pyrophosphoric acid, boron trifluoride and the Friedel-Crafts type metal halides, such as aluminum chloride, aluminum bromide, zinc chloride, ferric chloride, etc. The condensation reaction to form the alkylate charging stock herein is effected in the presence of said catalyst at temperatures within the range of from about −10° to about 50° C. for the relatively active or thermally labile catalysts, such as sulfuric acid and the aluminum halide catalysts, mentioned above, while somewhat higher temperatures of from about 80° to about 300° C. are utilized in the presence of catalysts which have a less deep-seated effect on the reactants herein provided, such as a so-called solid phosphoric acid catalyst which comprises a solid siliceous absorbent such as kieselguhr impregnated with a suitable phosphoric acid such as pyrophosphoric acid.

Following the completion of the alkylation reaction usually after a period of from about ½ to about 5 hours or more, a used catalyst phase generally separates from the alkylate product of the reaction as a sludge-like material which may be removed from the alkylate product or upper layer of the reaction mixture, for example, by simple decantation. The desired alkylate utilized as charging stock to the sulfonation stage of the present process is generally a specific boiling range fraction of the entire alkylate product selected on the basis of providing the most desirable wetting agent upon subsequent sulfonation.

The condensation of cyclopentadiene with a mono-olefinic hydrocarbon yields an alkylbicycloheptene as one product of the condensation reaction, formed in accordance with the following empirical equation:

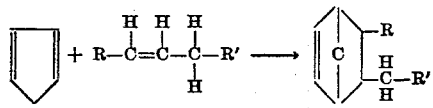

wherein R and R' may be hydrogen or alkyl. The resulting bicycloheptene when reacted with an aromatic hydrocarbon, such as benzene, in the presence of an alkylation catalyst yields the present alkylate comprising the charging stock to the sulfonation reaction in accordance with the mechanism indicated in the following equation:

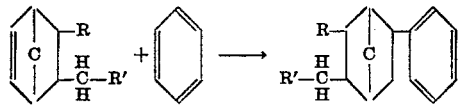

It is not to be assumed, however, that the products represented by the above proposed structures necessarily designate the ultimate or exclusive products of the reaction herein provided, nor is it intended to limit the scope of the invention in accordance with the mechanism as hereinabove proposed.

The sulfonation of the alkylation reaction product or a fraction thereof is desirably directed so as to obtain the mono-sulfonated product from which the preferred surface-active agents are prepared. Sulfonation of the alkylate is accomplished by reacting the above alkylate with a suitable sulfonating agent, such as concentrated sulfuric acid, an oleum containing free sulfur trioxide, preferably an oleum containing at least 30% free sulfur trioxide, sulfur trioxide itself, chlorosulfonic acid, and other sulfonating agents known to the art. Depending upon the particular charging stock employed in the process and the strength of the sulfonating agent, the sulfonation is effected at temperatures of from about −15° to about 80° C., preferably from about −15° to about 40° C. Sulfonation is desirably conducted in the presence of a liquid inert diluent which may be a low boiling point substance maintained in liquid phase by regulation of the ambient pressure and which may be allowed to evaporate at a selected sulfonation temperature to provide evaporation cooling in the reaction mixture, as the heat liberated by the exothermic sulfonation reaction tends to increase the temperature above the desired previously determined maximum limitation.

Other advantages of the presence of the inert diluent within the sulfonation reaction mixture is the resulting reduction in viscosity of the mixture making it more readily transferred from reactor to reactor or to successive reaction stages of the process and eliminating local high temperature zones in the reaction mixture by virtue of the resulting reduction in viscosity. In the absence of the diluent, the said high temperature zones in the highly viscous, static portions of the reaction mixture tend to develop, which, if not rapidly dissipated, produce undesirable discoloration of the product and in other respects results in a product of lower surface activity. Typical inert liquids utilizable in the sulfonation reaction as diluents include the liquefied paraffinic hydrocarbons, such as butane, pentane, hexane, etc. containing up to about 8 carbon atoms per molecule, their halogenated analogs, such as hexachloroethane, perfluorobutane, dichloroethylene, etc. and the cycloparaffinic hydrocarbons, such as cyclopentane, cyclohexane, etc. One of the preferred diluents utilizable in the sulfonation reaction, especially where the sulfonation temperature is desirably limited to a value of from about −15° C. to about +10° C. is a propane-butane fraction which boils at a temperature within said range, depending upon the ambient pressure, thereby providing for evaporative cooling during the reaction. The quantity of inert diluent introduced into the sulfonation reaction mixture, usually in admixture with the alkylbicycloheptyl aromatic compound, is preferably maintained in the sulfonation zone within the range of from about 0.5 to about 10 volume proportions of the alkylate charging stock. The ratio of reactants, that is, the sulfonating agent to alkylate originally charged into the sulfonation reaction is dependent, for the most part, upon the type of sulfonating agent employed. When utilizing concentrated sulfuric acid, for example, an acid containing from about 90 to about 100% sulfuric acid, the ratio of acid to alkylate charged to the sulfonation reaction is preferably maintained at from about 12 to about 6 molar proportions respectively. The corresponding molar ratio of reactants when utilizing a sulfuric acid oleum containing up to about 30% free sulfur trioxide is from about 2.0 to about 6.0 moles of total sulfur trioxide (calculated on the basis of free and combined sulfur trioxide, the latter being present as sulfuric acid) per mole of alkylate charging stock. In the case of oleums of greater free sulfur trioxide content than about 30%, up to about 60%, the molar ratio of total sulfur trioxide to alkylate is from about 1.5 to about 2.5, although in the case of each of the above-specified sulfonating agents, the molar ratio is also dependent to some extent upon the sulfonation temperature, the required molar ratio as specified in general, decreasing as the reaction temperature is increased.

Upon completion of the sulfonation reaction, usually following a contact period between the sulfonating agent and alkylate of from about ½ to about 4 hours (when the reactants are stirred during the sulfonation), the reaction mixture is allowed to settle until phase separation takes place, which occurs quite readily when an inert liquid diluent is employed in the sulfonation reaction mixture. A lower layer of the products containing a predominant proportion of the sulfonic acid derivative of the alkylate and the excess of sulfonating agent separates upon standing from an upper layer comprising inert diluent (if utilized) and unreacted alkylate (if any) with usually a small proportion of the sulfonic acid product dissolved therein. The upper layer is separated, for example, by decantation, washed with caustic or other aqueous neutralizing agent, the sulfonate salt of which is desired as the ultimate wetting agent of the present process and the separated aqueous phase reserved for subsequent use in the neutralization of the major portion of the sulfonic acid product as hereinafter provided. The washed or extracted upper layer containing the inert diluent is thereafter recovered and may be fractionally distilled to recover unsulfonated alkylate therefrom, if any, or recycled en masse directly to the sulfonation reaction for utilization in a subsequent sulfonation reaction.

The sulfonic acid-sulfonating agent phase separated from the sulfonation reaction mixture as provided above may be entirely neutralized as such, in which case the excess sulfonating agent consumes a portion of the neutralizing agent to form the corresponding salt thereof, or alternatively, the sulfonic acid may be separated from the excess sulfonating agent by means of a so-called "springing" treatment in which water is added to the reaction mixture until phase separation occurs. The latter alternative procedure is preferred, since the sulfate salts formed by neutralizing the excess sulfonating agent in the mixture may be purchased and subsequently added to the neutralized sulfonic acid product at much less expense than the cost of the neutralizing agent to form them via reaction with said excess sulfonating agent. Phase separation between the sulfonic acid and excess sulfonating agent during the "springing" treatment in most cases occurs when the sulfuric acid phase resulting from the addition of water to the sulfonic acid-sulfonating agent mixture contains from about 10 to about 20% of water, the phases being separated by means of simple decantation, especially in the presence of an inert diluent. Since the hydration of the mixture is, in general, an exothermic reaction which may liberate sufficient heat to adversely effect the quality and/or color of the sulfonic acid product if uncontrolled, it becomes desirable to have present in the mixture an inert diluent which will evaporate and thus provide evaporative cooling as water is introduced into the mixture. The diluent, furthermore, tends to reduce the viscosity of the reaction mixture and thus permits thorough and rapid admixture of the water in the acids without development of high temperature zones therein which is usually observed when "springing" in the absence of the diluent. The liberated sulfonic acids are somewhat soluble in the diluent and may completely dissolve therein when sufficient diluent is utilized; the diluent, thus, in addition, removes the sulfonic acids from the mixture as rapidly as freed therefrom. In this stage of the process the reactor in which springing is effected may be provided with a reflux condenser to continuously return vaporized diluent to the springing zone in liquid state, thus maintaining a substantially constant supply of diluent in said zone during the entire "springing" treatment. The springing may be effected continuously by introducing the water into the mixed acid phase at intermediate points along the line of flow of said mixed acids, for example through a conduit into one end of which the mixed acids are introduced and from the other end of which the diluted mixture of acids is removed.

The separated sulfonic acids as recovered by the prior "springing" stage may be utilized as such for wetting agent and/or detergent purposes, or, as preferred in some applications of the product, the sulfonic acids may be substantially neutralized with a suitable base, the salt of which is desired as the ultimate product. The salt form of the product is especially desirable where a neutral wetting agent is required, as in washing acid-sensitive materials or where the acid form of the product would cause precipitation of a reactant in solution, in emulsion, or in suspension, as in the use of the product as an emulsifier, for example in emulsion polymerization reactions. Suitable neutralizing agents for converting the alkylbicycloheptylarylsulfonic acid to the salt thereof include such bases as the alkali metal hydroxides, such as potassium and sodium hydroxides; the alkaline earth metal hydroxides, such as calcium and magnesium hydroxides; ammonia; the amines and alkanol amines, including the mono-, di- and tertiary alkyl and alkanol amines, such as methyl amine, diethylamine, tributylamine of the former class and the mono-, di- and triethanol amines of the latter class. In order to effect the desired neutralization an aqueous solution of the neutralizing agent, generally utilized in concentrations of from about 5 to about 40% of the base therein, is admixed with the separated sulfonic acid to form an aqueous solution or slurry of the sulfonate salt. Since the neutralization reaction is also exothermic, the reaction is preferably conducted in the presence of the volatile inert diluents hereinabove specified to provide evaporative cooling of the reaction mixture. The resulting aqueous slurry or solution of sulfonate salts may be dried by any suitable means, one of the preferred methods being that of spray drying the aqueous neutralization product to form spherical particles of the product which are readily soluble in water and which do not cake or powderize during subsequent handling thereof.

An alternative modification of the process flow following completion of the sulfonation stage of the process is that represented by transferring the entire sulfonation reaction mixture, including, if desired, the inert diluent, to the neutralization stage of the process flow without subjecting the mixture to intermediate springing. In such case, the neutralization reaction also forms salts of the excess sulfonating agent which are valuable as so-called "builder" or "extender" salts of the sulfonate detergent component. The latter alternative, however, is not generally preferred for the above specified reason that the sulfate salts formed in this manner are relatively more expensive than purchased sulfate salts because of the relatively high cost of the neutralizing agent. One advantage of the flow, however, is the elimination of the intermediate "springing" stage which involves additional equipment and labor costs.

When desired, the sulfonate salt or alternatively, the sulfonic acid, may be admixed with other salts which tend to enhance the detersive or wetting properties of the product. The latter salts which are designated in the art as builder or extender salts may be selected from the alkali metal, alkaline earth metal, ammonium, amine, or alkanol amine sulfates, phosphates, mono- and di-hydrogen phosphates, chlorides, nitrates, borates, silicates, and alkanoates, such as the acetates, and are generally present in admixture with the sulfonate or sulfonic acid product in amounts of from about 10 to about 80% of the composition, mixtures containing from about 40 to about 60% being especially preferred. The alkali metal sulfates, phosphates and polyphosphates are among the preferred builder salts when utilized as a detergent or wetting agent composition and are generally added to an aqueous solution of the sulfonate or sulfonic acid product and dried in solution or in admixture therewith to provide an intimate association of said components.

The present invention is further illustrated with reference to the following example, although said illustration is not to be interpreted in such manner as to limit the generally broad scope of the invention in strict accordance with the specific reactants, process flow or other variables stated therein.

An alkylbicycloheptene alkylating agent comprising 5-hexylbicyclo(2,2,1)-2-heptene is formed by the condensation of cyclopentadiene with 1-octene at a temperature of about 200° C. and at a pressure of approximately 75 atmospheres. A solution of 48 grams of said hexylbicycloheptene and 80 grams of benzene is added during 0.5 hour to a well stirred mixture of 60 grams of 96% sulfuric acid and 160 grams of benzene at 0° C. Stirring is continued for an additional 0.5 hour at 0° C., the catalyst layer (68 grams) separated from the hydrocarbon layer, and the latter washed, dried and distilled. The desired alkylate product formed in a yield of about 50% of theoretical is a phenylhexylbicycloheptane.

In the preparation of the sulfonic acid derivative of the above alkylate product, 60 grams of said alkylate is introduced into a rotating autoclave maintained at approximately 0° C. by means of an ice bath. 300 grams of normal butane is charged into the autoclave at a pressure of approximately 40 pounds per square inch, the resulting liquefied butane dissolving the alkylate product previously introduced into the autoclave. As the solution of alkylate and liquefied normal butane is stirred by rotation of the autoclave, approximately 113 grams (containing about 3.5 molar proportions of total sulfur trioxide as combined and free sulfur trioxide) is gradually introduced into the solution of butane and alkylate over a period of approximately 0.5 hour. The reaction mixture is maintained at substantially 0° throughout the reaction period by maintaining the ice bath surrounding the rotating autoclave. Following the complete addition of the oleum to the reaction mixture, the latter is stirred for an additional 1.5 hours and is then transferred to a vessel containing a motor-driven stirrer and a Dry Ice reflux condenser. Water is gradually added to the mixture as the latter is vigorously stirred, the resulting exothermic heat of hydration causing the butane to boil and the resulting vapors reflux back into the stirred vessel. Phase separation occurs after the addition of approximately 20 cc. of water to the reaction mixture, the lower sulfuric acid phase containing approximately 85% sulfuric acid. The upper butane-sulfonic acid phase is separated from the lower phase by decantation and is transferred to a neutralization reactor comprising a stirred vessel having attached thereto a Dry Ice reflux condenser. A 20% aqueous sodium hydroxide solution is stirred into the butane-sulfonic acid solution while the latter is vigorously stirred. The exothermic neutralization reaction causes a portion of the butane to evaporate from the mixture which refluxes into the Dry Ice condenser and returns to the neutralization vessel. The liquid butane phase is decanted from the aqueous, substantially neutral sulfonate solution and the latter reserved for subsequent treatment. Finely powdered sodium sulfate is added to the aqueous solution of the sulfonate salt until the weight proportion of sodium sulfate to the sulfonate salt is approximately 65 to 35. The resulting aqueous slurry is then evaporated to dryness with the aid of an infra-red lamp and the residue tested for detergency. A detergency test of the product by the standard Launderometer test method indicates that the product has approximately the same washing efficiency as sodium laurate.

I claim as my invention:

1. A surface-active agent comprising an alkylbicycloheptylarylsulfonate containing an alkyl group of at least 3 carbon atoms.

2. A process for the production of a surface-active agent which comprises alkylating an aromatic hydrocarbon containing a nuclearly displaceable hydrogen atom with an alkylbicyclo-(2,2,1)-2-heptene, thereafter sulfonating the resulting alkylate and neutralizing the alkylbicycloheptylarylsulfonic acid.

3. The process of claim 2 further characterized in that said aromatic hydrocarbon is a benzenoid hydrocarbon.

4. The process of claim 2 further characterized in that said aromatic hydrocarbon is benzene.

5. The process of claim 2 further characterized in that said sulfonating and neutralizing reactions are effected in the presence of an inert liquid diluent selected from the saturated hydrocarbons containing fewer than 8 carbon atoms per molecule and their halogenated analogs.

6. A process for the production of a surface-active agent which comprises alkylating an aromatic hydrocarbon containing a nuclearly displaceable hydrogen atom with an alkylbicyclo-(2,2,1)-2-heptene, sulfonating the resulting alkylate in the presence of an inert liquid diluent and adding water to the sulfonation reaction mixture to spring the resulting alkylbicycloheptylarylsulfonic acid product therefrom.

7. A process for the production of a surface-active agent which comprises alkylating an aromatic hydrocarbon containing a nuclearly displaceable hydrogen atom with an alkylbicyclo-(2,2,1)-2-heptene, admixing said alkylate with from about 0.5 to about 10 volume proportions of an inert liquid diluent, contacting the mixture with a sulfuric acid oleum at a temperature of from about −15° to about 80° C. at a pressure sufficient to maintain said diluent substantially in liquid phase at said temperature, thereafter adding water to the sulfonation reaction mixture in an amount sufficient to cause an aqueous sulfuric acid phase to separate from a phase comprising diluent and sulfonic acid, and reacting said last-mentioned phase with a neutralizing agent to form a sulfonate salt comprising said surface-active agent.

8. The process of claim 7 further characterized in that said sulfuric acid oleum contains at least 30% free sulfur trioxide.

9. The process of claim 7 further characterized in that said inert liquid diluent is normal butane.

10. The process of claim 7 further characterized in that said mixture of inert diluent and said alkylate is contacted with a sulfuric acid oleum at a temperature of from about −15° to about 40° C.

11. The process of claim 7 further characterized in that said alkylbicycloheptene is 5-hexylbicyclo(2,2,1)-2-heptene.

12. A process for the production of a surface-active agent which comprises alkylating an aromatic hydrocarbon containing a nuclearly displaceable hydrogen atom with an alkylbicycloheptene alkylating agent having an alkyl group containing at least 3 carbon atoms per group, thereafter sulfonating the resulting alkylate and neutralizing the alkylbicycloheptylarylsulfonic acid.

13. A process which comprises alkylating an aromatic compound having a nuclearly displaceable hydrogen atom with an alkylbicyclo(2,2,1)-2-heptene, and sulfonating the resultant alkylate.

14. The process of claim 13 further characterized in that said bicycloheptene compound contains an alkyl group of at least 3 carbon atoms.

15. The process of claim 13 further characterized in that said bicycloheptene compound is 5-hexylbicyclo(2,2,1)-2-heptene.

16. A surface-active agent comprising the sulfonation product of the alkylate of an aromatic hydrocarbon with an alkylbicyclo(2,2,1)-2-heptene.

LOUIS SCHMERLING.

REFERENCES CITED

The following references are of record in the file of this patent:

UNITED STATES PATENTS

| Number | Name | Date |
|---|---|---|
| 2,054,140 | Segessemann | Sept. 15, 1936 |
| 2,145,369 | Osterhof | Jan. 31, 1939 |

OTHER REFERENCES

Wilson et al., Chem. Rev., vol. 34 (1944), pp. 20, 28, 30 (3 pages).